United States Patent
Lee et al.

(10) Patent No.: US 12,232,207 B2
(45) Date of Patent: Feb. 18, 2025

(54) METHOD AND DEVICE FOR PERFORMING MULTI-UNIVERSAL SUBSCRIBER IDENTITY MODULE OPERATIONS

(71) Applicant: SHARP KABUSHIKI KAISHA, Sakai (JP)

(72) Inventors: An-An Lee, Taipei (TW); Hung-Chen Chen, Taipei (TW); Mei-Ju Shih, Taipei (TW); Yung-Lan Tseng, Taipei (TW); Hsin-Hsi Tsai, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 304 days.

(21) Appl. No.: 17/882,154

(22) Filed: Aug. 5, 2022

(65) Prior Publication Data

US 2023/0048297 A1 Feb. 16, 2023

Related U.S. Application Data

(60) Provisional application No. 63/260,049, filed on Aug. 6, 2021.

(51) Int. Cl.
*H04W 76/28* (2018.01)
*H04W 12/72* (2021.01)
*H04W 24/08* (2009.01)
*H04W 76/38* (2018.01)

(52) U.S. Cl.
CPC .......... *H04W 76/28* (2018.02); *H04W 12/72* (2021.01); *H04W 24/08* (2013.01); *H04W 76/38* (2018.02)

(58) Field of Classification Search
CPC ..... H04W 76/28; H04W 12/72; H04W 24/08; H04W 76/38; H04W 76/15; H04W 88/06
See application file for complete search history.

(56) References Cited

U.S. PATENT DOCUMENTS

| | | | |
|---|---|---|---|
| 10,623,646 B1 * | 4/2020 | Lee | G02B 7/08 |
| 10,623,946 B1 | 4/2020 | Kumar et al. | |
| 2023/0047050 A1 * | 2/2023 | Jung | H04W 72/0446 |
| 2023/0080113 A1 * | 3/2023 | Hong | H04W 68/02 |
| | | | 370/329 |

OTHER PUBLICATIONS

3GPP TS 38.331 V16.5.0 (Jun. 2021), 3rd Generation Partnership Project; Technical Specification Group Radio Access Network; NR; Radio Resource Control (RRC) protocol specification (Release 16).

* cited by examiner

*Primary Examiner* — Khoa Huynh
(74) *Attorney, Agent, or Firm* — ScienBiziP, P.C.

(57) ABSTRACT

A method for a UE to perform a MUSIM operation is provided. The method includes connecting to a first network associated with a first USIM; transmitting a request message to the first network, the request message including assistance information to request a time gap for the MUSIM operation; receiving a first time gap configuration from the first network in a case that a type of the time gap requested by the UE is aperiodic, the first time gap configuration indicating a starting SFN and a starting subframe of a first configured time gap; and in a case that the UE receives the first time gap configuration, switching to a second network, while keeping a connection to the first network, during the first configured time gap according to the first time gap configuration, the second network being associated with a second USIM.

20 Claims, 7 Drawing Sheets

METHOD AND DEVICE FOR PERFORMING MULTI-UNIVERSAL SUBSCRIBER IDENTITY MODULE OPERATIONS

CROSS-REFERENCE TO RELATED APPLICATION(S)

The present disclosure claims the benefit of and priority to U.S. Provisional Patent Application Ser. No. 63/260,049, filed on Aug. 6, 2021, entitled "METHOD AND APPARATUS FOR NETWORK SWITCHING MECHANISM IN MULTI-SIM OPERATION," the content of which is hereby incorporated fully by reference into the present disclosure for all purposes.

FIELD

The present disclosure generally relates to wireless communication and, more particularly, to methods and devices for performing Multi-Universal Subscriber Identity Module (MUSIM) operations.

BACKGROUND

With the tremendous growth in the number of connected devices and the rapid increase in user/network traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize network services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in next-generation wireless communication systems.

SUMMARY

The present disclosure is directed to methods and devices for performing a Multi-Universal Subscriber Identity Module (MUSIM) operation.

According to a first aspect of the present disclosure, a method for a User Equipment (UE) adapted to be equipped with a plurality of Universal Subscriber Identity Modules (USIMs) for performing a Multi-Universal Subscriber Identity Module (MUSIM) operation is provided. The method includes connecting to a first network associated with a first USIM of the plurality of USIMs; transmitting a request message to the first network, the request message including assistance information to request a time gap for the MUSIM operation; receiving a first time gap configuration from the first network in a case that a type of the time gap requested by the UE is aperiodic, the first time gap configuration indicating a starting System Frame Number (SFN) and a starting subframe of a first configured time gap; and in a case that the UE receives the first time gap configuration, switching to a second network, while keeping a connection to the first network, during the first configured time gap according to the first time gap configuration, the second network being associated with a second USIM of the plurality of USIMs.

In some implementations of the first aspect of the present disclosure, the method further includes receiving a second time gap configuration from the first network in a case that the type of the time gap requested by the UE is periodic, the second time gap configuration indicating a repetition period of a second configured time gap.

In some implementations of the first aspect of the present disclosure, the method further includes, in a case that the UE receives the second time gap configuration, switching to the second network, while keeping the connection to the first network, during the second configured time gap according to the second time gap configuration.

In some implementations of the first aspect of the present disclosure, the method further includes transmitting a gap release message to the first network; receiving a release message from the first network; and releasing the second time gap configuration in response to receiving the release message.

In some implementations of the first aspect of the present disclosure, the assistance information indicates a preferred starting SFN of the time gap and a preferred starting subframe of the time gap.

In some implementations of the first aspect of the present disclosure, the assistance information includes an indication of whether the type of the time gap requested by the UE is aperiodic.

In some implementations of the first aspect of the present disclosure, the first time gap configuration includes an indication of whether a type of the first configured time gap is aperiodic.

In some implementations of the first aspect of the present disclosure, the method further includes starting a prohibit timer upon transmitting the assistance information to the first network, wherein the UE is prohibited from transmitting another request message to the first network while the prohibit timer is running.

In some implementations of the first aspect of the present disclosure, the first configured time gap starts at the starting subframe with the starting SFN.

In some implementations of the first aspect of the present disclosure, the method further includes, after switching to the second network, monitoring a downlink channel on the second network during the first configured time gap.

According to a second aspect of the present disclosure, a User Equipment (UE) adapted to be equipped with a plurality of Universal Subscriber Identity Modules (USIMs) for performing a Multi-Universal Subscriber Identity Module (MUSIM) operation is provided. The UE includes transmission and reception circuitry and at least one processor. The at least one processor is coupled to the transmission and reception circuitry and configured to: connect the UE to a first network associated with a first USIM of the plurality of USIMs; transmit, via the transmission and reception circuitry, a request message to the first network, the request message including assistance information to request a time gap for the MUSIM operation; receive, by the transmission and reception circuitry, a first time gap configuration from the first network in a case that a type of the time gap requested by the UE is aperiodic, the first time gap configuration indicating a starting System Frame Number (SFN) and a starting subframe of a first configured time gap; and in a case that the UE receives the first time gap configuration, cause the UE to switch to a second network, while keeping a connection to the first network, during the first configured time gap according to the first time gap configuration, the second network being associated with a second USIM of the plurality of USIMs.

In some implementations of the second aspect of the present disclosure, the at least one processor is further configured to: receive, by the transmission and reception circuitry, a second time gap configuration from the first network in a case that the type of the time gap requested by the UE is periodic, the second time gap configuration indicating a repetition period of a second configured time gap.

In some implementations of the second aspect of the present disclosure, the at least one processor is further configured to: in a case that the UE receives the second time gap configuration, cause the UE to switch to the second network, while keeping the connection to the first network, during the second configured time gap according to the second time gap configuration.

In some implementations of the second aspect of the present disclosure, the at least one processor is further configured to: transmit, via the transmission and reception circuitry, a gap release message to the first network; receive, by the transmission and reception circuitry, a release message from the first network; and release the second time gap configuration in response to receiving the release message.

In some implementations of the second aspect of the present disclosure, the assistance information indicates a preferred starting SFN of the time gap and a preferred starting subframe of the time gap.

In some implementations of the second aspect of the present disclosure, the assistance information includes an indication of whether the type of the time gap requested by the UE is aperiodic.

In some implementations of the second aspect of the present disclosure, the first time gap configuration includes an indication of whether a type of the first configured time gap is aperiodic.

In some implementations of the second aspect of the present disclosure, the at least one processor is further configured to: start a prohibit timer upon transmitting the assistance information to the first network, wherein the UE is prohibited from transmitting another request message to the first network when the prohibit timer is running.

In some implementations of the second aspect of the present disclosure, the first configured time gap starts at the starting subframe with the starting SFN.

In some implementations of the second aspect of the present disclosure, the at least one processor is further configured to, after the UE switches to the second network, cause the UE to monitor a downlink channel on the second network during the first configured time gap.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
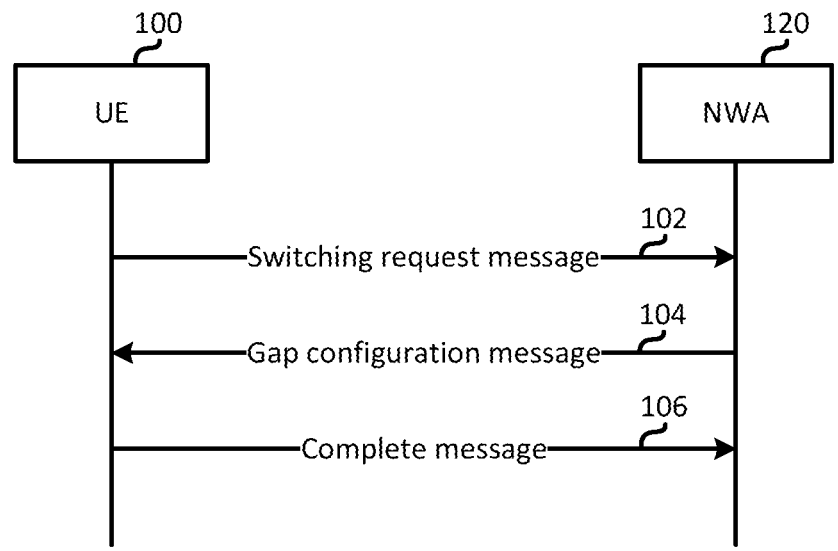
FIG. 1 is a communication diagram of a procedure for acquiring a gap configuration, according to an example implementation of the present disclosure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in some implementations" or "in one example" may each refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture, such as a Long-Term Evolution (LTE) system, an LTE-Advanced (LTE-A) system, an LTE-Advanced Pro system, or a 5G NR Radio Access Network (RAN), may typically include at least one base station (BS), at least one UE, and one or more optional network elements that provide connection within a network. The UE may communicate with the network, such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT), such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LIE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, LTE/NR sidelink communication services, LTE/NR sidelink discovery services, and/or LTE/NR Vehicle-to-Everything (V2X) services.

The terms, definitions, and abbreviations as given in this document are either imported from existing documentation (European Telecommunications Standards Institute (ETSI), International Telecommunication Union (ITU), or elsewhere) or newly created by 3GPP experts whenever the need for precise vocabulary is identified.

Multi-Universal Subscriber Identity Module (USIM) devices have been more and more popular in different areas and countries. For example, a user may have both a personal subscription and a business subscription in one device or have two personal subscriptions in one device for different services (e.g., one individual subscription and one "family circle" plan subscription). However, support for multi-USIM within a device is currently handled in an implementation-specific manner without any support from 3GPP specifications, resulting in a variety of implementations and UE behaviors. Such a situation may cause an increasing complexity for UE vendors, unexpected UE behavior for network vendors or operators, and degraded user experience. It would be beneficial to provide standardizing support for a multi-USIM (or MUSIM) UE from a performance perspective in that network functionality can be based on predictable UE behavior.

A multi-USIM (or multi-Subscriber Identity Module (multi-SIM)) UE may refer to a UE that is adapted to be equipped with a plurality of USIMs (or Subscriber Identity Modules (SIMs)) and is capable of using the equipped USIMs or SIMs to perform a MUSIM operation with one or more networks. If the number of USIMs or SIMS equipped on a multi-USIM/SIM UE is two, such a multi-USIM/SIM UE may also be referred to as a dual-USIM UE or dual-SIM UE. Unless otherwise specified, the "UE" mentioned in the present disclosure may refer to a multi-USIM UE or a MUSIM UE. The terms "MUSIM," "multi-SIM," and "multi-USIM" may be interchangeably used in the present disclosure. The terms "gap duration," "gap," "time gap," and "switching gap" may be interchangeably used in the present disclosure.

For a multi-USIM/SIM UE or a dual-USIM/SIM UE, it may connect/register to more than one network. While actively communicating with the system associated with one USIM (which is also referred to as the current system/ network), the multi-USIM device may need to perform some activities in the system associated with another USIM (e.g., to respond to a paging message, or perform a mobility update). Therefore, it may need a notifying procedure for a multi-USIM UE to leave or release the Radio Resource Control (RRC) connection with the current system.

A MUSIM UE may be configured with at least one gap duration by the current serving network for the UE to temporarily switch to another network for certain actions (e.g., paging reception). During the configured gap duration, the UE may receive Downlink (DL) data from another network instead of receiving DL data from the current serving network. That is, during the configured gap duration, the UE may temperately switch to a target network to receive DL data (or monitor one or more DL channels) from the target network without disconnecting from the current network.

Moreover, in MUSIM operations, the UE behavior of receiving Earthquake and Tsunami Warning System (ETWS)/Commercial Mobile Alert System (CMAS) messages while the UE is performing network switching mechanisms may also be considered.

As discussed above, while a UE is connected to Network A (NWA), e.g., the UE is in an RRC connected state (or RRC_CONNECTED state) on NWA, the UE may also need to perform some periodic and/or aperiodic activities on Network B (NWB). The activities may include monitoring Physical Downlink Control Channel (PDCCH) occasion(s), monitoring paging Downlink Control Information (DCI), receiving paging message(s), performing measurement(s), acquiring System Information (SI), performing registration procedure(s), performing a Tracking Area Update (TAU) procedure, and/or performing a RAN Notification Area Update (RNAU) procedure. In the present disclosure, NWA may refer to a cell associated with NWA, a BS associated with NWA, a CN associated with NWA, or any combination of thereof. NWB may refer to a cell associated with NWB, a BS associated with NWB, a CN associated with NWB, or any combination of thereof.

In some circumstances, due to limited UE capability (e.g., limited reception capability), a UE may not be able to perform the periodic and/or aperiodic activities on NWA and NWB at the same time (e.g., the UE may not be able to perform DL data reception on NWA and NWB simultaneously). For example, for a UE (e.g., equipped with a USIM registered to NWA and a USIM registered to NWB) with a 1 Receiver (RX)/1 Transmitter (TX) hardware configuration or with a 2RX/1TX hardware configuration, if the UE needs to perform a multi-USIM operation while the UE is currently connected to NWA (e.g., the UE is in RRC_CONNECTED state in NWA), the UE may need to stop DL reception on NWA and use a (switching) gap duration configured by NWA to temporarily switch to NWB to receive paging message(s) on NWB. Given this, the UE may switch the connection from NWA to NWB (e.g., by switching DL reception capability and/or UL transmission capability from data/signal reception/transmission of NWA to data/signal reception/transmission of NWB during the configured (switching) gap.) For example, the UE may not be allowed to perform some periodic and/or aperiodic activities (e.g., including monitoring PDCCH occasions, monitoring paging DCI, receiving paging messages, performing measurements, acquiring SI, performing a registration procedure, performing a Tracking Area Update (TAU) procedure, performing a RAN-based Notification Area Update (RNAU) procedure, etc.) in NWA but the UE may be allowed to perform some periodic and/or aperiodic activities (e.g., monitoring PDCCH occasions, monitoring paging DCI, receiving paging messages, performing measurements, acquiring SI, performing a registration procedure, performing a TAU procedure, performing an RNAU procedure, etc.) in NWB.

Compared to other activities, like performing Mobile Originating (MO) data/call service, the periodic and/or aperiodic activities mentioned above may only take the UE a relatively short period of time to perform. Therefore, the UE can remain in RRC_CONNECTED state in NWA while the UE is switching to NWB to perform the periodic and/or aperiodic activities on NWB. Whether the UE transitions to RRC_IDLE/RRC_INACTIVE state in NWA or remains in RRC_CONNECTED state in NWA may depend on the decision of NWA.

A switching gap for the network switching (e.g., from NWA to NWB) may be required for a UE in a multi-USIM mode (or a multi-USIM UE). NWA (or current network) and the UE may negotiate with each other and/or exchange information to set a switching gap configuration. For example, NWA may send/configure the UE with one or more switching gap configurations for the UE. Within a switching gap determined based on the switch gap configuration, the UE may switch to another network (e.g., NWB) to perform certain activity(-ies) (e.g., including monitoring PDCCH occasion(s), monitoring paging DCI, receiving paging message(s), performing SI acquisition, sending busy indication(s), performing measurement(s), performing MO signaling, performing a registration procedure, performing a TAU procedure, and/or performing an RNAU procedure) and remain in RRC_CONNECTED state in the current network (e.g., NWA). In the switching gap, the UE may not perform DL data transmission/reception with NWA.

The UE may receive a switching gap configuration through dedicated signaling (e.g., including an RRC reconfiguration (RRCReconfiguration) message, an RRC resume (RRCResume) message, an RRC release (RRCRelease) message (with or without a suspend configuration), and/or a new RRC message) while attaching/connecting to a network. The switching gap configuration may include an Information Element (IE) denoted as MeasGapConfig (e.g., as provided in 3GPP Technical Specification (TS) 38.331 v16.5.0) to determine the switching gap configuration, control the setup/release of measurement gaps, and/or other switching gap related information (e.g., including initial status of the associated switching gap, and/or type of the associated switching gap). In some implementations, the switching gap may be determined by a new switching gap IE (e.g., denoted as MUSIMGapConfig) to specify the switching gap configuration, control setup/release of measurement gaps, and/or other switching-gap-related information (e.g., including initial status of the associated switching gap, type of the associated switching gap, and/or priority) for specific/ dedicated multi-USIM use. In some implementations, a UE may receive a switching gap configuration from system information (e.g., via System Information Block 1 (SIB1) and/or other SI).

In some implementations, a switching gap may be a periodic gap or an aperiodic gap. The types of a switching gap may include a periodic gap and an aperiodic gap. In some implementations, a UE may be configured with one or more switching gap configurations (or switching gap patterns), e.g., for different situations or for different networks, where different switching gap configuration(s)/pattern(s) may be configured with different parameters (e.g., IE mgl and IE mgrp in IEMeasGapConfig or repetition period and duration in IEMUSIMGapConfig). The IE mgl may refer to a measurement gap length in a time unit of millisecond (ms) of the associated measurement gap. The IE mgrp may refer to a measurement gap repetition period in a unit of ms of the associated measurement gap.

In some implementations, a UE may switch from NWA to NWB by leaving RRC_CONNECTED state in NWA to perform certain activities associated with NWB when certain "leaving" trigger events happen. In some implementations, a UE may switch from NWA to NWB without leaving RRC_CONNECTED state in NWA to perform certain activities associated with NWB when certain leaving trigger events happen.

In some implementations, a UE may switch from NWA to NWB without leaving RRC_CONNECTED state in NWA and perform certain activities associated with NWB during a configured switching gap when certain leaving trigger events happen.

In some implementations, whether a UE currently connected to NWA transitions to an RRC idle (RRC_IDLE) or an RRC inactive (RRC_INACTIVE) state or remains in RRC_CONNECTED state during the gap may depend on the decision made by NWA. In some implementations, the UE may automatically apply/initiate a local release procedure to release the RRC Connection and/or the Core Network connection to NWA.

Examples 1-5 of leaving trigger events are described as follows:

Example 1: the UE intends to perform paging reception (e.g., to monitor PDCCH occasions, monitor paging DCI or receive a paging message) associated with NWB.

Example 2: the UE intends to measure signal quality associated with NWB (e.g., including serving cell measurements, neighbor cell measurements for cell (re)selection, and/or other purposes).

Example 3: the UE intends to perform SI acquisition from NWB.

Example 4: the UE intends to communicate MO signaling with NWB, perform a registration procedure with NWB, perform a TAU procedure with NWB, and/or perform an RNAU procedure associated with NWB.

Example 5: the UE performs MO data/call service associated with NWB.

A UE may disconnect NWA by leaving RRC_CONNECTED state in NWA and connect to NWB by entering RRC_CONNECTED state in NWB.

The leaving trigger events (e.g., Examples 1-5) may be categorized into three scenarios 1-3. In Scenario 1 (corresponding to Examples 1-2), the UE may temporarily switch out of its current network (e.g., NWA), without disconnecting to the current network, to perform certain short-time periodic activities in another network (e.g., NWB). While switching from NWA to NWB during a switching gap, the UE may not be configured/instructed to leave RRC_CONNECTED state in NWA, and the corresponding category may be identified with a deterministic/configured/fixed duration and/or a periodic pattern. In scenario 1, the UE may only switch its receiver for NWB-related reception. In scenario 2 (corresponding to Examples 3-4), the UE may temporarily switch out of its current network (e.g., NWA), without disconnecting to the current network, to perform certain short time aperiodic activities in another network (NWB). While switching from NWA to NWB during a switching gap, the UE may not be configured/instructed to leave RRC_CONNECTED state in NWA, and the corresponding category may be identified with a conditional/one-shot switch duration. In scenario 2, the UE may switch both its transmitter and its receiver for NWB-related transmission and reception. In Scenario 3 (corresponding to Example 5), the UE may leave its current network (e.g., NWA) to perform certain long-time activities in NWB. In this scenario, the UE may disconnect NWA by leaving RRC_CONNECTED state in NWA and connect to NWB by entering RRC_CONNECTED state in NWB, and no switching gap may be required.

For Scenario 1 and the Scenario 2, a UE may be configured with a switching gap configuration (or a switching gap based on a switching gap configuration). In a switching gap, the UE may temporally switch to NWB to perform certain periodic and/or aperiodic activities (e.g., including receiving a paging message, performing measurements, acquiring system information, performing a registration procedure, performing a TAU procedure, and/or performing an RNAU procedure). In some implementations, a UE may monitor paging DCI based on the PDCCH monitoring occasion(s) configured for receiving the paging message(s).

A UE may be configured with different gap patterns/gap configurations for different purposes (e.g., monitoring paging DCI, receiving a paging message, performing measurements, acquiring system information, performing a registration procedure, performing a TAU procedure, and/or performing an RNAU procedure). The gap patterns/gap configurations may be a periodic gap pattern/gap configuration applicable for Scenario 1 (e.g., for receiving paging or performing measurements) or an aperiodic gap pattern applicable for Scenario 2 (e.g., for acquiring system information, performing a registration procedure, performing a TAU procedure, or performing an RNAU procedure).

Further, according to the UE's capabilities (e.g., 1RX/1TX or 2RX/1TX), different actions may require different gap types. For example, there may be multiple types for different gap patterns, e.g., normal periodic gap, normal aperiodic gap, a periodic gap with capability loan, and an aperiodic gap with capability loan.

In some implementations, a UE (e.g., a multi-USIM UE with 1RX/1TX) may be configured with at least one normal periodic/aperiodic gap pattern/gap configuration. In some implementations, a UE (e.g., a multi-USIM UE with 2RX/1TX) may be configured with at least one normal periodic/aperiodic gap pattern/gap configuration or periodic/aperiodic gap pattern/gap configuration with capability loan. In some implementations, a gap pattern/gap configuration may be a normal periodic gap pattern/gap configuration. During each (periodic) gap based on a normal periodic gap pattern/gap configuration, the UE may switch to NWB for data/signal reception and may not receive the data/signal from NWA. In some implementations, a gap pattern/gap configuration may be a normal aperiodic gap pattern/gap configuration. During a (one-shot) gap based on a normal aperiodic gap pattern/gap configuration, the UE may switch to NWB for data/signal reception and may not receive the data/signal from NWA. In some implementations, a gap pattern/gap configuration may be a periodic gap pattern/gap configuration with capability loan. During each (periodic) gap based on a periodic gap pattern/gap configuration with capability loan, the UE may schedule part of RX capability to NWB for data/signal reception and may still be capable of receiving the data/signal from NWA. In some implementations, a gap pattern/gap configuration may be an aperiodic gap pattern/gap configuration with capability loan. During a (one-shot) gap based on an aperiodic gap pattern/gap configuration with capability loan, the UE may schedule part of RX capability to NWB for data/signal reception and may still be capable of receiving the data/signal from NWA.

With choosing a different periodic time and duration lengths, a periodic gap pattern/gap configuration may be designed to align with the paging Discontinuous reception (DRX) cycle of NWB to cover Paging Frame (PF)/Paging Occasion (PO) for receiving paging (e.g., paging DCI or paging message). In some implementations, a periodic gap pattern/gap configuration may be designed to accommodate or align with the Synchronization Signal Block burst configuration of NWB.

In some implementations, a UE may send a switching request message to the network for requesting a periodic gap pattern/gap configuration or an aperiodic pattern/configuration, after detecting the need for an aperiodic gap or the periodic gap. The switching request message may include assistance information related to a certain requested gap pattern/gap configuration. In some implementations, a network (e.g., NWA) may send a switching gap pattern/gap configuration to a UE (e.g., in response to a switching request message). The switch gap pattern/gap configuration may include the initial status of the associated switching gap, type of the associated switching gap, priority, etc.

In some implementations, a network may assume that a UE may know which gap configuration/gap pattern can fulfill the UE's requirements when receiving a gap configuration/gap pattern from the network. In some implementations, the NW may indicate the purpose of a gap configuration to the UE (e.g., by using Gap Usage).

In some implementations, gap assistance information may be included in a switching request message (e.g., UE assistance information (UEAssistanceInformation) message, as shown in 3GPP TS 38.331 v16.5.0). The UE may transmit an RRC message or a Non-Access Stratum (NAS) message to the NWA for a request of gap assistance information.

In some implementations, a UE may transmit a switching request message to a network (e.g., Network A) for requesting aperiodic/periodic gap configuration/gap pattern. A switching request message may include suggested/required starting timing information (e.g., offset value or start SFN and subframe), suggested/required gap length, suggested/required gap repetition period, DRX cycle of NWB (e.g., PF/PO), UE capability type, suggested/required Gap Usage, and/or suggested/required Gap Identity (ID).

In some implementations, a network (e.g., Network A) may transmit a gap configuration message to provide an aperiodic/periodic gap configuration/gap pattern. For example, a network may transmit a gap configuration message in response to a switching request message received from a UE. In some implementations, a UE may reply with a complete message to a network (e.g., Network A) in response to a gap configuration message received from the network. The UE may transmit a complete message when successfully being configured by the received gap configuration or gap pattern included in the received gap configuration message. The network may consider that the UE is successfully configured by the configured gap configuration/gap pattern while receiving the complete message.

FIG. 1 is a communication diagram of a procedure for acquiring a gap configuration from NWA, according to an example implementation of the present disclosure. In action 102, UE 100 may transmit a switching request message to NWA 120. In action 104, NWA 120 may transmit a gap configuration message to UE 100 in response to the switching request message. In action 106, UE 100 may reply to NWA 120 with a complete message.

In some implementations, the switching request message may contain gap-related information suggested/required by the UE (e.g., UE 100). For example, the switching request message may contain suggested/required starting timing information (e.g., offset value or start SFN and subframe) of a gap, a suggested/required gap length, a suggested/required gap repetition period, a DRX cycle of NWB (e.g., PF/PO), a UE capability type, a suggested/required Gap Usage, and/or a suggested/required Gap ID.

In some implementation, the UE capability type may be included in the switching request message to indicate the UE's capability. In some implementations, the UE capability type may relate to the UE's TX/RX capability. For example, the UE capability type may indicate the number of TXs/RXs the UE has: when set to a first value (e.g., 0), the UE capability type indicates that the UE is equipped with 1RX/1TX; when set to a second value (e.g., 1), the UE capability type indicates that the UE is equipped with 2RX/1TX.

The switching request message may be transmitted via UL RRC signaling (e.g., via Signaling Radio Bearer (SRB) 1 or SRB2). The UL RRC signaling may include a UE assistance information message (e.g., a UEAssistanceInformation message) as described in 3GPP TS 38.331 v16.5.0. In some implementations, the UE may transmit the switching request message to the secondary node (e.g., SeNB/SgNB) via SIB3 for scenarios such as Multi-RAT-Dual Connectivity, New Radio Dual Connection (NR-DC), E-UTRAN New Radio-Dual Connectivity (EN-DC), and/or Next Generation (NG)-RAN E-UTRA-NR Dual Connectivity (NG-ENDC).

In some implementations, the UE may transmit the switching request message to the serving NW (e.g., NWA) via a Small Data Transmission (SDT) procedure (e.g., a Random Access Small Data Transmission procedure or a Configured Grant Small data transmission procedure) and/or the subsequent data exchange procedure during the SDT procedure while the UE is also configured with Random Access Resources and/or Configured Grant Resources for SDT. During the SDT procedure, the UE may stay in RRC_INACTIVE state and SRB1 may be resumed for control signaling exchange. The control signaling exchange may also apply to other signaling exchanges described in the present disclosure.

In some implementations, a UE (e.g., a MUSIM UE with 1RX/1TX) may send to NWA a switching request message including gap assistance information to ask for normal periodic gap(s), so as to, e.g., receive paging related to NWB or perform measurements related to NWB. The gap assistance information may include at least one of the following: a suggested/required starting timing information (e.g., offset value or starting SFN and/or starting subframe) of a gap, a suggested/required gap length, a suggested/required gap repetition period, a UE capability type, a suggested/required Gap Usage, and a suggested/required Gap ID. Additionally or alternatively, the switching request message may include DRX-related information, such as the DRX cycle of another network (e.g., NWB), to ask for normal periodic gap(s). In some implementations, a UE may send a switching request message to NWA while the UE's MUSIM status is on and connected to NWA (e.g., in RRC_CONNECTED state in NWA).

In some implementations, a UE (e.g., a MUSIM UE with 2RX/1TX) may send a switching request message to the NWA to ask for periodic gap(s) with a capability loan (e.g., to receive paging related to NWB or performing measurements related to NWB). The switching request message may contain gap assistance information and/or DRX-related information. The gap assistance information may include suggested/required starting timing information (e.g., offset value or starting SFN and/or starting subframe) of a gap, a suggested/required gap length, a suggested/required gap repetition period, a UE capability type, a suggested/required Gap Usage, and/or a suggested/required Gap ID. The DRX-related information may include a DRX cycle of another network (e.g., NWB). In some implementations, a UE may send a switching request message to NWA while the UE's MUSIM status is on and connected to NWA (e.g., in RRC_CONNECTED state in NWA).

In some implementations, a UE may send a switching request message to NWA after the UE receives an indication of SI change (or SI modification) from, e.g., NWB.

In some implementations, a UE may send a switching request message to NWA while the UE is communicating MO signaling for a registration procedure, a TAU procedure, or an RNAU procedure. For example, an RNAU procedure may be performed/triggered when a periodic RNAU timer (e.g., T380 timer) expires, a previously barred RNAU is alleviated, or the UE has moved out of the coverage of the configured RNA.

In some implementations, a UE may send a new switching request message in a case that the paging-related information of NWB has changed (e.g., IE 5G-S-TMSI or other paging-related parameters are changed).

For example, after cell reselection is performed in NWB/NWA or when the NWB/NWA changes the paging-related configuration and notifies the UE of the paging-related configuration, the PO/PF and/or paging-related parameters of NWB may be changed. Therefore, the UE may need to ask for a new gap pattern/gap configuration for receiving paging on the new PO(s) in NWB.

For example, as the PO/PF and/or the paging related parameters of NWB have changed, the current configured gap pattern/gap configuration for receiving paging may overlap with a current gap pattern/gap configuration for performing measurements. Therefore, a UE may request for a new gap pattern/gap configuration for performing measurements by transmitting a switching request message. Afterwards, the UE may receive an RRC message including the reconfiguration of gap pattern/gap configuration for performing measurements from the NWA.

In some implementations, a UE may send a new switching request message in a case that a new (target) cell is reselected (e.g., the UE camps on a new cell of NWB, or the UE hands over to a new (target) serving cell of NWA). NWA may reconfigure a new gap pattern(s)/new gap configuration to the UE accordingly.

After the cell reselection, the UE may camp on a new cell of NWB with a different Synchronization Signal Block (SSB) burst configuration (e.g., different subcarrier spacing or different periodicity/sequence for SSB configuration). Therefore, the UE may need to ask for a new gap pattern/gap configuration for performing measurements based on the new SSB burst. A serving cell may provide one or two SSB Measurement Timing Configurations (SMTCs) (e.g., for power saving purposes), and a new gap configuration(s) may be required.

In some implementations, a UE may send a switching request message to ask for deleting/stopping/removing an existing gap pattern/gap configuration. In some implementations, a UE may send a switching request message to ask for parameter(s) update/changing for an existing gap pattern/gap configuration. In some implementations, a UE may send a switching request message to ask for a (longer or shorter) duration update for a periodic gap pattern/gap configuration while the periodic gap pattern/gap configuration cannot satisfy the UE's requirement (e.g., the requirement for receiving paging and/or performing measurement in NWB). For example, a UE may not successfully receive paging related to NWB by using the configured gap(s) (e.g., the gap duration is not long enough). In some implementations, a UE may send a switching request message to ask for a (longer or shorter) duration update for an aperiodic gap pattern/gap configuration while the aperiodic gap pattern/gap configuration cannot satisfy the UE's requirement (e.g., the requirement for performing SI acquisition and/or for performing a registration procedure, a TAU procedure, or an RNAU procedure in NWB).

In some implementations, a UE may not successfully receive all on-demand SIBs by using the configured gap (e.g., in a case that the gap duration is not long enough). In some implementations, a UE may not successfully complete a TAU procedure and/or an RNAU procedure by using the configured gap (e.g., in a case that the gap duration is not long enough).

In some implementations, a new indicator may be added in a gap configuration IE for MUSIM use, as shown in Table 1.

TABLE 1

```
MeasGapConfig ::= SEQUENCE {
    gapFR2                              SetupRelease { GapConfig },
    [[ gapFR1                           SetupRelease { GapConfig },
       gapUE                            SetupRelease { GapConfig },
    ]]
    gapMUSIM                            SetupRelease { GapConfig },
}
GapConfig ::= SEQUENCE {
gapOffset                               INTEGER (0..159),
mgl                                     ENUMERATED {ms1dot5, ms3, ms3dot5,
ms4, ms5dot5, ms6, T1, T2,...,TN },
mgrp                                    ENUMERATED {ms20, ms40, ms80,
ms160, t1, t2,..., tn, none},
[[
refServCellIndicator                    ENUMERATED
{pCell, pSCell, mcg-FR2}                   OPTIONAL -- CondNEDCorNRDC
]],
[[
refFR2ServCellAsyncCA-r16               ServCellIndex OPTIONAL,
                                           -- Cond AsyncCA
mgl-r16                                 ENUMERATED {ms10, ms20} OPTIONAL
                                           -- Cond PRS
]]
[[
```

TABLE 1-continued

```
Gap ID
ENUMERATED {0, 1, 2, 3},                        OPTIONAL -- Cond MUSIM
Gap Usage                                       ENUMERATED
{"for receiving paging", "for performing measurements",
"for acquiring system information", "for UE performing
registration/TAU/RNAU"}                         OPTIONAL -- Cond MUSIM
]]
}
```

In Table 1, a gap configuration (or GapConfig) for MUSIM use is provided. A new gap pattern/gap configuration (or gapMUSIM) is included in a measurement gap configuration (or MeasGapConfig) for MUSIM use. If a UE's (a MUSIM UE) MUSIM status is ON and one of the USIMs connected to network is in RRC_CONNECTED state, then the UE may be configured with gapMUSIM. The MUSIM status may be a status that shows whether a UE is in a multi-USIM operation or not. For example, if a UE includes a USIM registered to a network and another USIM registered to another network, the UE's MUSIM status may be considered as ON. If a UE includes a USIM registered to a network and another USIM deregistered to another network, the UE's MUSIM status may be considered as OFF.

A UE may report/inform its current MUSIM status to the network (e.g., NWA or NWB). If NWA receives a switching request message from a UE that asks for an aperiodic gap, NWA may reply to the UE a configuration message including gapMUSIM, where gapMUSIM (or the corresponding GapConfig) may include one or more (configurable) parameters, such as a gap offset (e.g., gapOffset), mgl, mgrp, and/or Gap ID.

As discussed above, a UE may use a configured gap to switch from a first network (e.g., NWA) to a second network (e.g., NWB) to perform certain activities on the second network (e.g., receiving paging message, performing measurements, acquiring system information, performing a registration procedure, performing a TAU procedure, and/or performing an RNAU procedure). When receiving a gap pattern/gap configuration, the UE may switch to NWB without leaving RRC_CONNECTED state (or without leaving RRC_INACTIVE state) in NWA.

In some implementations, in GapConfig, value(s) of the gap length (e.g., duration of receiving paging) may be included in IE mgl; value(s) of repetition period (e.g., paging occasions, or none for aperiodic gap) may be included in IE mgrp.

In some implementations, the Gap ID may be included in the GapConfig to identity a gap pattern/gap configuration. The Gap ID may be associated with a gap pattern/gap configuration. The network may command/instruct a UE to remove/delete a gap pattern/gap configuration by indicating the associated gap ID. The UE may suggest activating, deactivating, resuming, or suspending a gap pattern/gap configuration, or activating, deactivating, resuming, or suspending a gap based on a gap pattern/gap configuration by indicating the associated gap ID in signaling (e.g., an RRC message, a Medium Access Control (MAC) Control Element (CE), or DCI).

In some implementations, the Gap ID may be included in the GapConfig to identity a gap pattern/gap configuration. The maximum number of Gap IDs allowed to be used may be pre-defined or pre-configured.

In some implementations, a Gap Usage may be included in the GapConfig to indicate the usage/purpose of an associated gap pattern/gap configuration. For example, the Gap Usage may indicate that the gap is used for receiving paging. The Gap Usage may indicate that the associated gap pattern/gap configuration is configured for the UE to receive paging related to another network (e.g., NWB) during gap(s) of the associated gap pattern/gap configuration.

In some implementations, a Gap Usage may indicate that the gap is used for performing measurements. For example, the Gap Usage may indicate that the associated gap pattern/gap configuration is configured for the UE to perform measurements related to another network (e.g., NWB) during gap(s) of the associated gap pattern/gap configuration.

In some implementations, a Gap Usage may indicate that the gap is used for acquiring system information. For example, the Gap Usage may indicate that the associated gap pattern/gap configuration is configured for the UE to acquire system information related to another network (e.g., NWB) during gap(s) of the associated gap pattern/gap configuration.

In another example, a Gap Usage may indicate that the gap is used for performing registration/TAU/RNAU. For example, the Gap Usage may indicate that the associated gap pattern/gap configuration is configured for the UE to perform a registration procedure, a TAU procedure, or an RNAU procedure related to another network (e.g., NWB) during gap(s) of the associated gap pattern/gap configuration. The number (or the types) of Gap Usages may be pre-defined or pre-configured.

In some implementations, the Gap ID(s) and Gap Usage(s) may be represented by an index of a look-up table or an index of a pre-defined rules. For example, if the index associated with a gap pattern/gap configuration is set to a specific value (e.g., 0), the gap pattern/gap configuration may be indicated to be used for receiving paging related to another network (e.g., NWB in the example). For example, if the index associated with a gap pattern/gap configuration is set to a specific value (e.g., 1), the gap pattern/gap configuration may be indicated to be used for performing measurements related to another network (e.g., NWB). For example, if the index associated with a gap pattern/gap configuration is set to a specific value (e.g., 2), the gap pattern/gap configuration may be indicated to be used for acquiring system information related to another network (e.g., NWB). For example, if the index associated with a gap pattern/gap configuration is set to a specific value (e.g., 3), the gap pattern/gap configuration may be indicated to be used for performing a registration procedure, a TAU procedure, or an RNAU procedure related to another network (e.g., NWB in the example). The number of indexes may be pre-defined or pre-configured.

A new switching gap for dedicated MUSIM use is provided in Table 2.

TABLE 2

```
MUSIMGapConfig ::= SEQUENCE {
starting time,                   INTEGER (0..159),
repetition period                 ENUMERATED {T1, T2,..., none},
duration                        ENUMERATED {t1, t2,..., tn, none},
Gap ID
ENUMERATED {0,1,2,3},
Gap Usage                       ENUMERATED {"for
receiving paging", "for performing measurements", "for acquiring system
information", "for UE performing registration/TAU/RNAU"}
OPTIONAL -- Cond MUSIM
}
```

Table 2 shows a new switching gap configuration IE (MUSIMGapConfig) for MUSIM use. This new switching gap configuration IE may contain at least one of starting time, repetition period, duration, Gap ID, or Gap Usage. The starting time may contain information about an offset value which is the gap offset of the gap pattern with a repetition period or indicating a starting SFN and/or a starting subframe of the gap. The repetition period may be set based on information related to the paging occasions and SSB burst. If the leaving trigger events are aperiodic (e.g., acquiring system information, and performing registration/TAU, RNAU), the value of the repetition period may be set to none or not present, or may be absent.

In some implementations, a UE may consider a gap pattern/gap configuration as a periodic gap pattern/gap configuration if the value of the corresponding repetition period is NOT set to none (or 0). In some implementations, a UE may consider a gap pattern/gap configuration as a periodic gap pattern/gap configuration if the corresponding repetition period is present. In some implementations, a UE may consider a gap pattern/gap configuration as an aperiodic gap pattern/gap configuration if the value corresponding to the repetition period is set to none (or 0) or the like. In some implementations, a UE may consider a gap pattern/gap configuration as an aperiodic gap pattern/gap configuration if the corresponding repetition period is not present. In some implementations, a UE may consider a gap pattern/gap configuration as an aperiodic gap pattern/gap configuration if the corresponding starting time information is present in the gap pattern/gap configuration. The corresponding starting information may indicate a starting SFN and/or starting subframe of the gap.

In some implementations, the duration may be set by considering the leaving trigger events (e.g., receiving paging message (e.g., paging DCI/paging record), performing measurements, acquiring system information, and performing registration/TAU, RNAU). In some implementations, the Gap ID may be included in GapConfig to identity a gap pattern/gap configuration. The Gap ID may be associated with a gap pattern/gap configuration. The network may command/instruct a UE to remove/delete a gap pattern/gap configuration by indicating the associated gap ID. The UE may suggest activating, deactivating, resuming, or suspending a gap pattern/gap configuration, or activating, deactivating, resuming, or suspending a gap based on a gap pattern/gap configuration by indicating the associated gap ID in signaling (e.g., a RRC message, a MAC CE, or DCI).

In some implementations, the Gap ID may be included in the GapConfig to identity a gap pattern/gap configuration. The maximum number of Gap IDs allowed to be used may be pre-defined or pre-configured.

In some implementations, the Gap Usage may be included in GapConfig to indicate the usage/purpose of an associated gap pattern/gap configuration. For example, a Gap Usage may indicate that the gap is used for receiving paging and indicate that the associated gap pattern/gap configuration is configured for the UE to receive paging related to another network (e.g., NWB in the example) during gap(s) of the associated gap pattern/gap configuration. In another example, a Gap Usage may indicate that the gap is used for performing measurements and indicate that the associated gap pattern/gap configuration is configured for the UE to perform measurements related to another network (e.g., NWB) during gap(s) of the associated gap pattern/gap configuration. In another example, a Gap Usage may indicate that the gap is used for acquiring system information and indicate that the associated gap pattern/gap configuration is configured for the UE to acquire system information related to another network (e.g., NWB) during gap(s) of the associated gap pattern/gap configuration. In another example, a Gap Usage may indicate that the gap is used for the UE to perform registration/TAU/RNAU procedure(s) and indicate that the associated gap pattern/gap configuration is configured for the UE to perform registration/TAU/RNAU procedure(s) related to another network (e.g., NWB) during gap(s) of the associated gap pattern/gap configuration.

The number (or the types) of Gap Usages may be pre-defined or pre-configured. In some implementations, Gap ID and Gap Usage may be represented by an index of a look-up table as shown in Table 3.

TABLE 3

| Gap ID | Gap Usage |
| --- | --- |
| 0 | Receive paging related to another network. |
| 1 | Perform measurements related to another network. |
| 2 | Acquire system information related to another network. |
| 3 | Perform registration/TAU/RNAU related to another network. |

In some implementations, Gap ID and Gap Usage may be represented by an index determined by a pre-defined rule. For example, if the index associated with a gap pattern/gap configuration is set to a first value (e.g., 0), the gap pattern/gap configuration may be indicated to be used for receiving paging related to another network (e.g., NWB). If the index associated with a gap pattern/gap configuration is set to a second value (e.g., 1), the gap pattern/gap configuration may be indicated to be used for performing measurements related to another network (e.g., NWB in the example). If the index associated with a gap pattern/gap configuration is set to a third value (e.g., 2), the gap pattern/gap configuration may be indicated to be used for acquiring system information related to another network (e.g., NWB in the example). If the index associated with a gap pattern/gap configuration is set to a fourth value (e.g., 3), the gap pattern/gap configuration may be indicated to be used for performing registration/TAU/RNAU procedure(s) related to another network (e.g., NWB in the example). The number of indexes may be pre-defined or pre-configured.

In some implementations, a UE may send a release request message to ask for releasing periodic gap pattern(s)/gap configuration(s) (e.g., for receiving paging or performing measurements in NWB) and/or releasing DRX-related information (e.g., DRX cycle) of NWB, to NWA. In some implementations, a UE may send a release request message while the PO(s) of NWB change (e.g., 5G-s-TMSI or paging related parameters change).

In some implementations, after (re)selecting a new cell during cell reselection in NWB, the PO/PF and/or paging related parameters of NWB may be changed. Therefore, the UE may need to ask for releasing the existing gap pattern(s)/gap configuration(s).

In some implementations, after (re)selecting a new cell during cell reselection in NWB, the UE may camp on a different cell of NWB with a different SSB burst. Therefore, the existing gap pattern/gap configuration for performing measurements based on the previous SSB burst may need to be released.

In some implementations, a UE may send a release request message to ask for releasing periodic gap patterns/gap configuration(s) (e.g., for receiving paging or performing measurements in NWB) and/or releasing DRX-related information (e.g., DRX cycle) of NWB, to NWA. In some implementations, a UE may send a release request message while (re)selecting a new cell during cell reselection in NWB.

In some implementations, after (re)selecting a new cell during cell reselection in NWB/NWA, the PO/PF and/or paging related parameters of NWB may be changed. Therefore, the UE may ask for releasing the existing gap pattern(s)/gap configuration(s) for receiving paging on the previous PO(s) in NWB.

In some implementations, after (re)selecting a new cell during cell reselection in NWB/NWA, the UE may camp on a different cell of NWB with a different SSB burst. Therefore, the UE may ask for releasing the existing gap pattern(s)/gap configuration(s) for performing measurement based on the previous SSB burst.

In some implementations, a UE may send a release request message to NWA while UE's MUSIM status turns off.

In some implementations, a UE may send a release request message to NWA while the UE's RRC state in NWA becomes RRC_IDLE or RRC_INACTIVE state.

In some implementations, a UE may send a release request message to ask for releasing aperiodic gap pattern(s)/gap configuration(s) (e.g., for updated SI message or performing registration/TAU/RNAU procedure(s)) to NWA. In some implementations, a UE may send a release request message after the UE completes a certain action (e.g., for updated SI message or performing registration/TAU/RNAU procedure(s)) in NWB. The UE may switch back to NWA before the aperiodic gap ends.

In some implementations, a UE may send a release request message to ask for releasing a periodic gap pattern/gap configuration while the periodic gap pattern/gap configuration cannot satisfy the UE's needs (e.g., the need for receiving paging and/or performing measurement in NWB).

In some implementations, a UE may send a release request message to release an existing/ongoing aperiodic gap pattern/gap configuration (e.g., for updated SI message or performing registration/TAU/RNAU procedure(s)) to NWA while/before aperiodic gap times up/expires/runs out.

In some implementations, a UE may send a release request message to ask for releasing periodic gap pattern(s)/gap configuration(s) (e.g., for receiving paging or performing measurements in NWB) and/or releasing DRX-related information (e.g., DRX cycle) of NWB, to NWA. Afterward, the UE may receive a release gap configuration message from NWA in response to the release request message. A release request message may include a release gap configuration.

In some implementations, a UE may not resend a release request message to the network to ask for releasing periodic gap pattern(s)/gap configuration(s) until a timer (e.g., delay budget) expires if the UE does not receive the release gap configuration message from NWA. In some implementations, the timer may (re)start when a UE sends a release request message. In some implementations, a timer may stop when the UE receives a command from a network (e.g., a release gap configuration message from NWA). While the timer is running, the UE may be prohibited from (re)sending a release request message. When/after the timer expires, the UE may be allowed to (re)send a release request message.

In some implementations, a UE may send an indication/request to NWA for disconnecting from NWA by leaving RRC_CONNECTED state in NWA and connecting to NWB by entering RRC_CONNECTED state in NWB. The UE may send a release request message for releasing aperiodic gap pattern(s)/gap configuration(s) configured for acquiring system information in NWB while the SIB's SI broadcast status (si-BroadcastStatus) is set to a value "not broadcasting".

In some implementations, if si-BroadcastStatus in SI scheduling information (SI-SchedulingInfo) is set to 'not-broadcasting', the UE may need to proceed with RA procedure to acquire those SIB(s).

In some implementations, a UE may send a switching request message to NWA. Afterward, the UE may receive a gap configuration message from NWA in response to the switching request message. A gap configuration message may include a switching gap configuration (or gap pattern/gap configuration).

In some implementations, a UE may send a complete message to NWA in response to a gap configuration message from NWA.

In some implementations, a UE may not resend a switching request message for requesting periodic and/or aperiodic gap pattern(s)/gap configuration(s) until a timer (e.g., delay budget) expires if the UE does not receive the gap configuration message from NWA. In some implementations, the timer may (re)start when a UE sends a switching request message. In some implementations, the timer may stop when the UE receives a command from a network (e.g., a gap configuration from NWA). While the timer is running, the UE may be prohibited from (re)sending a switching request message. When/after the timer expires, the UE may be allowed to (re)send a switching request message. In some implementations, the UE may monitor a PDCCH and/or to receive a PDSCH (e.g., to receive the gap configuration message from NWA) while the timer is running.

In some implementations, a UE may stop (re)sending a switching request message while receiving a gap configuration message from a network (e.g., NWA). For example, after resending the switching request message, the UE may not receive any gap configuration message from NWA as a response. In this case, the UE may wait for a timer period and resend another switching request message after the timer period expires. The UE may suspend/stop sending a switching request message upon receiving a gap configuration message from NWA, which can serve the purpose of sending the switching request message. In some implementations, a UE may stop (re)sending a switching request message for requesting periodic gap pattern(s)/gap configuration(s) in a case that paging related information of NWB has changed (e.g., IE 5G-S-TMSI, PO, and/or other paging-related parameters changed).

Assistance information included in a switching request message may be updated/changed for requesting new gap pattern(s)/gap configuration(s) in a case that paging-related information of NWB has changed.

In some implementations, a UE may stop (re)sending a switching request message for requesting periodic/aperiodic gap pattern(s)/gap configuration(s) while a cell is (re)selected (e.g., the UE camps on a new cell in NWB or hands over to a new serving cell in NWA).

Assistance information included in a switching request message may be updated/changed for requesting new gap pattern(s)/gap configuration(s) in a case that a cell is (re) selected.

In some implementations, a UE may stop (re)sending a switching request message for requesting periodic/aperiodic gap pattern(s)/gap configuration(s) in a case that the starting timing information (e.g., offset value or starting SFN and/or subframe) has changed. In some implementations, in a case that assistance information included in a previous switching request message becomes invalid, the UE may send another switching request message with the new (valid) assistance information and inform the network that the previous assistance information (or the corresponding switching request message) is invalid (or is not required anymore). In some implementations, if the UE asks for an aperiodic gap but the network (e.g., NWA) cannot respond to the request in time, the UE may transmit another switching message with new assistance information for a new aperiodic gap and inform the network that the previous assistance information (or the corresponding switching request message) should be ignored.

In some implementations, a UE may stop (re)sending a switching request message for requesting periodic/aperiodic gap pattern(s)/gap configuration(s) in a case that the UE's MUSIM status turns off. In some implementations, a UE may stop (re)sending a switching request message for requesting periodic/aperiodic gap pattern(s)/gap configuration(s) in a case that the UE's RRC state in NWA becomes RRC_IDLE or RRC_INACTIVE state.

In some implementations, a UE may change/update assistance information included in a previous switching request message and resend the switching request message with the new assistance information if the UE receives a reject message in response to the previous switching request message from NWA. The UE may stop resending the switching request message until the UE receives corresponding Gap pattern(s)/gap configuration(s) message from NWA.

In some implementations, the UE may determine its further actions depend on UE implementations if the network doesn't respond to the UE's switching request message (e.g., within a time period, which may be pre-specified/predetermined/preconfigured or decided by the UE itself). In some implementations, a UE may request to leave the current serving network (e.g., NWA) if the current serving network doesn't respond to the switching request message (e.g., for a long period). Leaving the current serving network (e.g., NWA) may cause the UE to transition to RRC_IDLE or RRC_INACTIVE state in NWA.

In some implementations, a UE may autonomously leave the current serving network (e.g., NWA) if NWA doesn't respond to a switching request message (e.g., for a long period). Leaving the current serving network (e.g., NWA) may cause the UE to transition to RRC_IDLE or RRC_INACTIVE state in NWA. In some implementations, a UE may switch the MUSIM mode to OFF if NWA doesn't respond for a switching request message (e.g., for a long period). For example, the UE may deregister from NWA. For example, the UE may switch off the USIM associated with NWA.

In some implementations, a new Logical Channel ID (LCID) value in an LCID field of a subheader may be used to identify a Gap Activation/Deactivation MAC CE. There may be an LCID field per MAC subheader. The LCID field size may be 6 bits.

In some implementations, the Gap Activation/Deactivation MAC CE may have a fixed size and may include a single octet or more than one octet. In some implementations, the Gap Activation/Deactivation MAC CE may have a fixed size with one or more $G_i$ fields (which will be described later). In some implementations, a Gap Activation/Deactivation MAC CE may have a fixed size with one or more R fields (which will be described later).

In some implementations, a Gap Activation/Deactivation MAC CE may have a variable size. In some implementations, a Gap Activation/Deactivation MAC CE may have a variable size with one or more $G_i$ fields. In some implementations, a Gap Activation/Deactivation MAC CE may have a variable size with one or more R fields. In some implementations, a single octet bitmap may be used to indicate the activation/deactivation status of the configured gap pattern(s)/gap configuration(s) if the highest configured GAP ID is less than a specific value (e.g., 8). In some implementations, a four-octet bitmap may be used to indicate the activation/deactivation status of the configured gap pattern(s)/gap configuration(s) if the highest configured GAP ID is equal to or more than a specific value (e.g., 8).

Figure 2:
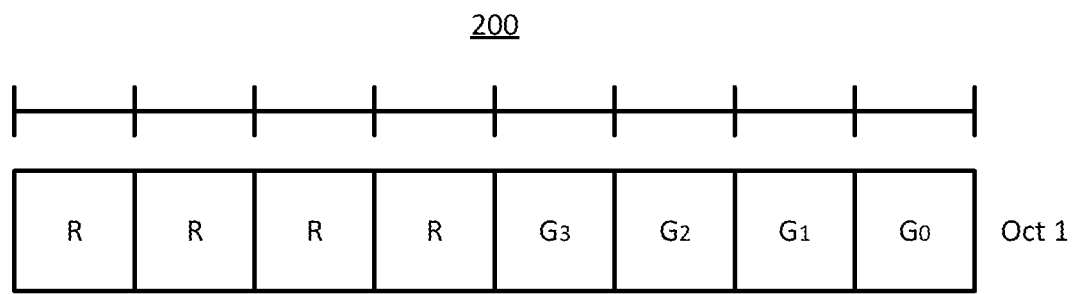
FIG. 2 is a diagram illustrating a data format of a Gap Activation/Deactivation Medium Access Control (MAC) Control Element (CE), according to an example implementation of the present disclosure.

FIG. 2 is a diagram illustrating a data format of a Gap Activation/Deactivation MAC CE 200, according to an example implementation of the present disclosure. As illustrated in FIG. 2, the Gap Activation/Deactivation MAC CE 200 contains at least one byte (e.g., Oct 1 in FIG. 2) that includes several R fields and $G_i$ fields (e.g., $G_0$, $G_1$, $G_2$, and $G_3$ in FIG. 2).

In some implementations, the $G_i$ field may indicate the activation/deactivation status of the gap pattern/gap configuration #i, where i is an index associated with the GAP ID. In some implementations, the $G_i$ field may indicate the activation/deactivation status of the gap pattern(s)/gap configuration #i, where i is an index ranked based on an ascending order (or a descending order) of those gap patterns/gap configurations considered/identified/configured as periodic gap patterns/gap configurations. In some implantation, the $G_i$ field may be set to a specific value (e.g., 1) to indicate that the associated gap pattern/gap configuration is suggested/indicated to be activated, or set to a specific value (e.g., 0) to indicate that the associated gap pattern/gap configuration is suggested/indicated to be deactivated.

In the Gap Activation/Deactivation MAC CE 200, the R fields represent reserved bits. Each reserved bit may be set to a predetermined value (e.g., 0).

Figure 3:
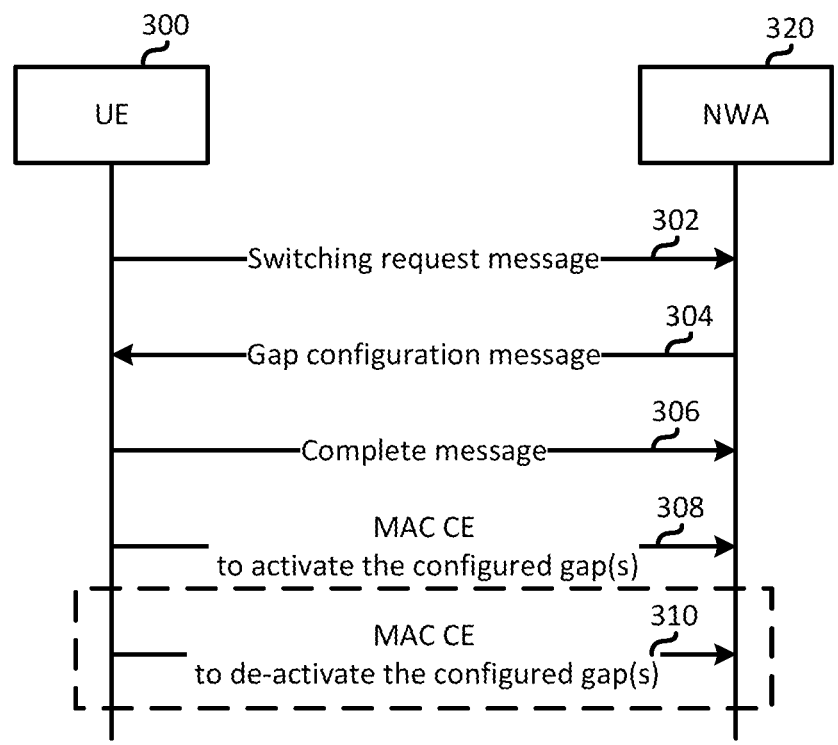
FIG. 3 is a communication diagram of a MAC CE Activation/Deactivation procedure for a configured gap, according to an example implementation of the present disclosure.

FIG. 3 is a communication diagram of a MAC CE Activation/Deactivation procedure for a configured gap, according to an example implementation of the present disclosure.

In action 302, UE 300 may transmit a switching request message to NWA 320. In action 304, NWA 320 may transmit a gap configuration message to UE 300 in response to receiving the switching request message. In action 306, UE 300 may transmit a complete message to NWA 320 in response to receiving the gap configuration message, meaning that UE 300 has been successfully configured with gap(s) by NWA 320. The gap(s) may include periodic gap(s) and/or aperiodic gap(s).

In actions 308 and 310, after being configured with gap(s), UE 300 may send to NWA 320 a MAC CE to activate the configured gap(s) or to de-activate the configured gap(s), without a response/confirm/approval of NWA 320. That is, UE 300 is able to activate/deactivate a certain configured gap by itself via a MAC CE and NWA 320 will always accept UE 300's attempt.

Figure 4:
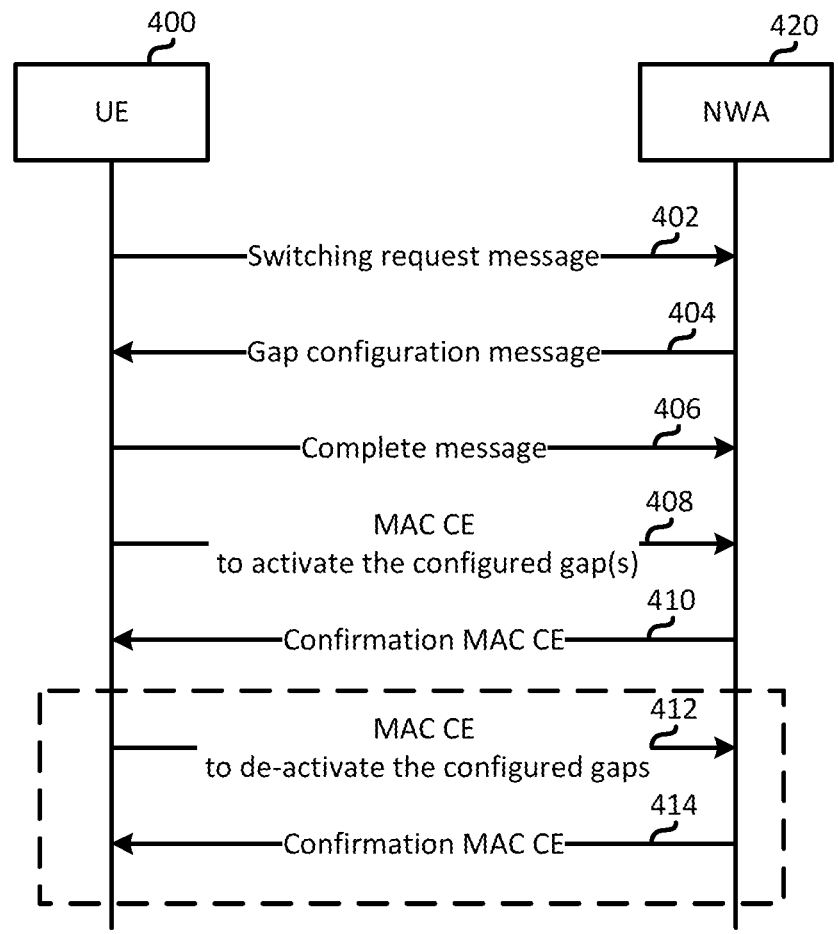
FIG. 4 is a communication diagram of another MAC CE Activation/Deactivation procedure for a configured gap, according to an example implementation of the present disclosure.

FIG. 4 is a communication diagram of a MAC CE Activation/Deactivation procedure for a configured gap, according to an example implementation of the present disclosure. In some implementations, a UE may send a MAC CE to inform the NWA of certain periodic and/or aperiodic gaps that the UE suggests to activate/de-activate. The UE may activate/de-activate the gap(s) after receiving NWA's response/confirmation/approval (e.g., a Confirmation MAC CE from NWA).

As illustrated in FIG. 4, in action 402, UE 400 may transmit a switching request message to NWA 420. In action 404, NWA 420 may transmit a gap configuration message to UE 400 in response to receiving the switching request message. In action 406, UE 400 may transmit a complete message to NWA 420 in response to receiving the gap configuration message, meaning that UE 400 has been successfully configured with gap(s) by NWA 420. The gap(s) may include periodic gap(s) and/or aperiodic gap(s).

In actions 408 and 410, UE 400 may send to NWA 420 a MAC CE to activate the configured gap(s) and receive a corresponding confirmation MAC CE from NWA 420. Additionally or alternatively, in actions 412 and 414, UE 400 may send to NWA 420 a MAC CE to de-activate the configured gap(s) and thereafter receive a corresponding confirmation MAC CE from NWA 420.

In some implementations, a UE does not resend a MAC CE to activate/de-activate the configured (periodic and/or aperiodic) gap(s) until a timer expires, in a case the UE does not receive the Confirmation MAC CE from NWA. In some implementations, the timer may (re)start when a UE (re)sends a MAC CE. In some implementations, the timer may stop when the UE receives a command from the network (e.g., a Confirmation MAC CE from NWA). While the timer is running, the UE may be prohibited from sending another MAC CE to activate/deactivate gaps. When the timer expires, the UE may be allowed to send a MAC CE to activate/deactivate the configured gaps again.

Figure 5:
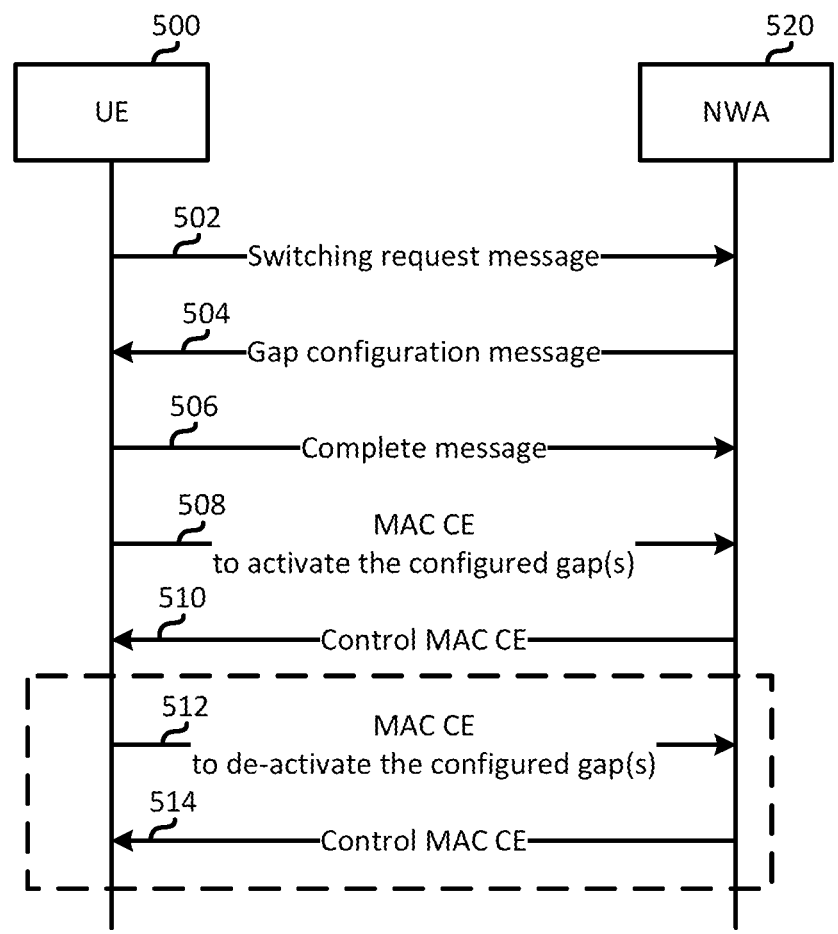
FIG. 5 is a communication diagram of another MAC CE Activation/Deactivation procedure for a configured gap, according to an example implementation of the present disclosure.

FIG. 5 is a communication diagram of a MAC CE Activation/Deactivation procedure for a configured gap, according to an example implementation of the present disclosure. In some implementations, a UE may send to NWA a MAC CE to activate/de-activate periodic and/or aperiodic gaps after gaps configured with NWA's response. NWA may then transmit a Control MAC CE to the UE in response to receiving the MAC CE to activate/de-activate the gaps. The Control MAC CE may have a fixed size. For example, the Control MAC CE size may be 2 bits. If the Control MAC CE is set to a specific value (e.g., 0), the Control MAC CE may be indicated to be used for confirming the gap to activate/de-activate. For example, if the Control MAC CE is set to a specific value (e.g., 1), the Control MAC CE may be indicated to be used for refusing the gap to activate/de-activate.

As illustrated in FIG. 5, in action 502, UE 500 may transmit a switching request message to NWA 520. In action 504, NWA 520 may transmit a gap configuration message to UE 500 in response to receiving the switching request message. In action 506, UE 500 may transmit a complete message to NWA 520 in response to receiving the gap configuration message, meaning that UE 500 has been successfully configured with gap(s) by NWA 520. The gap(s) may include periodic gap(s) and/or aperiodic gap(s).

In actions 508 and 510, UE 500 may send to NWA 520 a MAC CE to activate the configured gap(s) and then receive a corresponding control MAC CE from NWA 520. The control MAC CE in action 510 may indicate UE 500 that certain configured gap(s) are (allowed) to be activated. Additionally or alternatively, in actions 512 and 514, UE 500 may send to NWA 520 a MAC CE to de-activate the configured gap(s) and then receive a corresponding control MAC CE from NWA 520. The control MAC CE in action 514 may indicate UE 500 that certain configured gap(s) are (allowed) to be de-activated.

In some implementations, a UE may send a MAC CE to a network (e.g., NWA) to suggest/indicate activating/deactivating configured periodic/aperiodic gap pattern(s)/gap configuration(s). For example, after receiving a gap pattern/gap configuration, a UE may send a Gap Activation/Deactivation MAC CE to activate the gap pattern/gap configuration by setting the associated $G_i$ field of the gap pattern/gap configuration to a specific value (e.g., 1). For example, a UE may send a MAC CE containing a $G_1$ field with a value of "1" to NWA to activate periodic gap pattern/gap configuration associated with the $G_1$ field. For example, a UE may send a MAC CE containing a $G_2$ field with a value of 0 to NWA to deactivate aperiodic gap pattern/gap configuration associated with the $G_2$ field.

In some implementations, the initial status of a received gap pattern/gap configuration may be considered/configured/indicated as inactivated/de-activated/disabled. The UE may need to send a Gap Activation/Deactivation MAC CE to activate the gap pattern/gap configuration when the UE requires the corresponding gap(s). In some implementations, the initial status of a received gap pattern/gap configuration may be considered/configured/indicated as activated/enabled. The UE may need to send a Gap Activation/Deactivation MAC CE to deactivate the gap pattern/gap configuration when the UE does not require the corresponding gap(s).

In some implementations, a UE does not resend a MAC CE for requesting periodic and/or aperiodic gap(s) activating/de-activating until a timer expires if the UE does not receive the control MAC CE from NWA. In some implementations, the timer may (re)start when a UE sends a MAC CE. In some implementations, a timer may stop when the UE receives a command from the network (e.g., a control MAC CE from NWA). While the timer is running, the UE may be prohibited from sending another MAC CE to activate/deactivate gaps. When the timer expires, the UE may be allowed to send another MAC CE to activate/deactivate gaps.

In some implementations, a UE may send a MAC CE to the network (e.g., NWA) to suggest/indicate activating/deactivating configured periodic/aperiodic gap pattern(s)/ gap configuration(s) while the UE detects paging-related information of NWB changed (e.g., 5G-s-TMSI, PO or paging related parameters change).

In some implementations, a UE may send a MAC CE to the network (e.g., NWA) to suggest/indicate activating/deactivating configured periodic/aperiodic gap pattern(s)/gap configuration(s) while a cell is (re)selected (e.g., the UE camps on a new cell in NWB or hands over to a new serving cell in NWA).

In some implementations, a UE may send a MAC CE to the network (e.g., NWA) to suggest/indicate activating/deactivating configured periodic/aperiodic gap pattern(s)/gap configuration(s) while UE's MUSIM status is off.

In some implementations, a UE may send a MAC CE to the network (e.g., NWA) to suggest/indicate activating/deactivating configured periodic/aperiodic gap pattern(s)/gap configuration(s) while the UE's RRC state in NWA becomes RRC_IDLE or RRC_INACTIVE state.

In some implementations, a UE may send a MAC CE to the network (e.g., NWA) to deactivate an aperiodic gap pattern(s)/gap configuration(s) while the UE switches back to the NWA due to action completion (e.g., for acquiring system information or performing a registration procedure, a TAU procedure, or an RNAU procedure related to NWB) before the associated aperiodic gap ends.

In some implementations, a UE may send a MAC CE to deactivate periodic/aperiodic gap patterns/gap configuration(s) while the UE completes certain actions (e.g., monitoring paging DCI and/or receiving paging message, especially the short message (e.g., paging for ETWS and CMAS indication and/or system information modification) and/or performing measurements and/or acquiring system information (SI) and/or performing a registration procedure and/or performing a TAU procedure in NWB before the periodic/aperiodic gap pattern/gap configuration expires afterwards.

In some implementations, a UE may send a MAC CE to the network (e.g., NWA) to deactivate an aperiodic gap pattern(s)/gap configuration(s) while two aperiodic/periodic gaps overlap (e.g., in time domain).

In some implementations, the priority of a gap pattern/gap configuration may be considered/configured/indicated lower. The UE may need to send a Gap Deactivation MAC CE to deactivate the gap pattern/gap configuration whose priority is lower when two aperiodic/periodic gaps overlap.

In some implementations, a UE may need to send a Gap Deactivation MAC CE to deactivate the gap pattern/gap configuration whose starting time is later while two aperiodic/periodic gaps overlap.

In some implementations, the UE may transmit the MAC CE (to activate/de-activate the configured gap(s)) to either the master node or to the secondary node while Multi-Radio Dual Connectivity (MR-DC) configuration is applied in the UE. Moreover, the Master Node and the Secondary Node may exchange the information received via the MAC CE. In some other implementations, the NW may also transmit the suggested MAC CE (e.g., a confirmation MAC CE or a control MAC CE) to the UE via the Master Node or the Secondary Node.

In some implementations, the MAC CE (to activate/de-activate the configured gap(s)) may only be allowed/enabled to be transmitted from the UE to Master Node (or Secondary Node). In some implementations, the MAC CE (e.g., a confirmation MAC CE or a control MAC CE) may only be allowed/enabled to be transmitted from the Master Node (or Secondary Node) to the UE.

In some implementations, a UE may send an indication/request to NWA for disconnecting NWB by leaving RRC_CONNECTED state in NWA and connecting to NWB by entering RRC_CONNECTED state in NWB and send a MAC CE to deactivate aperiodic gap pattern(s)/gap configuration(s) configured for acquiring system information in NWB while the SIB's si-BroadcastStatus is set 'notbroadcasting'. For example, if si-BroadcastStatus in SI-SchedulingInfo is set 'notbroadcasting', the UE may need to proceed with RA procedure to acquire those SIB(s).

In some implementations, a UE (e.g., a MUSIM UE with 1RX/1TX) may need to stop DL reception on NWA and use a (switching) normal periodic/aperiodic gap pattern(s)/gap configuration(s) for a certain action (e.g., monitoring paging DCI and/or receiving paging message, especially the short message (e.g., paging for ETWS and CMAS indication and/or system information modification) and/or performing measurements and/or acquiring SI and/or performing a registration procedure and/or performing a TAU procedure) while the normal periodic/aperiodic gap pattern/gap configuration is activated (associated with at least one of $G_0$, $G_1$, $G_2$, and $G_3$).

In some implementations, a UE (e.g., a MUSIM UE with 2RX/1TX) may schedule part of RX capability to NWB for data/signal reception and may still be capable of receiving the data/signal from NWA and use a (switching) periodic/aperiodic gap pattern(s)/gap configuration(s) with capability loan for a certain action (e.g., monitoring paging DCI and/or receiving paging message, especially the short message (e.g., paging for ETWS and CMAS indication and/or system information modification) and/or performing measurements and/or acquiring SI and/or performing a registration procedure and/or performing a TAU procedure) while the periodic/aperiodic gap pattern/gap configuration with capability loan is activated (associated with at least one of $G_0$, $G_1$, $G_2$, and $G_3$).

In some implementations, a UE may ignore/suspend configured periodic/aperiodic gap pattern(s)/gap configuration(s) configured by NWA for multi-USIM usage while receiving paging (e.g., paging DCI, short message, or paging message) which may include ETWS indication and/or CMAS indication and/or Public Warning System (PWS) indication (e.g., provided by NWA/NWB). In some implementations, a UE may ignore/suspend configured periodic/aperiodic gap pattern(s)/gap configuration(s) configured by NWA to acquire ETWS/CMAS/PWS notification(s) (or message(s)).

For example, a short message in the received paging DCI may include ETWS indication and/or CMAS indication and/or PWS indication (e.g., provided by NWA or NWB). For ETWS/CMAS/PWS notification(s) (or message(s)) acquisition, the UE may ignore/suspend the activated gap pattern(s)/gap configuration(s) or associated gap(s) configured by NWA for multi-USIM usage. The UE may acquire SIB6, SIB7, or SIB8 immediately.

In some implementations, a UE (e.g., a MUSIM UE with 1RX/1TX) may switch back to NWA in a case that the UE completes certain actions (e.g., monitoring paging DCI and/or receiving paging message, especially the short message (e.g., paging for ETWS and CMAS indication and/or system information modification) and/or performing measurements and/or acquiring SI and/or performing a registration procedure and/or performing a TAU procedure) in NWB before the normal periodic/aperiodic gap pattern/gap configuration expires.

In some implementations, a UE (e.g., a MUSIM UE with 2RX/1TX) may schedule RX capability back to NWA in a case that the UE completes certain actions (e.g., monitoring paging DCI and/or receiving paging message, especially the short message (e.g., paging for ETWS and CMAS indication and/or system information modification) and/or performing measurements and/or acquiring SI and/or performing a registration procedure and/or performing a TAU update) in NWB before the periodic/aperiodic gap pattern/gap configuration with capability loan expires.

In some implementations, a UE (e.g., a MUSIM UE with 1RX/1TX) may stop the current action (e.g., monitoring paging DCI and/or receiving paging message, especially the short message (e.g., paging for ETWS and CMAS indication and/or system information modification) and/or performing measurements and/or acquiring system information (SI) and/or performing a registration procedure and/or performing a tracking area update (TAU) procedure) in NWB and switch back to the NWA in a case that the periodic/aperiodic gap pattern/gap configuration cannot satisfy the UE's requirements.

In some implementations, a UE (e.g., a MUSIM UE with 2RX/1TX) may keep performing the ongoing action/procedure (e.g., monitoring paging DCI and/or receiving paging message, especially the short message (e.g., paging for ETWS and CMAS indication and/or system information modification) and/or performing measurements and/or acquiring system information (SI) and/or performing a registration procedure and/or performing a tracking area update (TAU) procedure) in NWB and ignore the periodic/aperiodic gap pattern/gap configuration. Afterwards, the UE may switch back to NWA if the UE completes the action/procedure in NWB.

In some implementations, as normal periodic gap pattern(s)/gap configuration(s) are configured and activated, a UE (e.g., a MUSIM UE with 1RX/TX) may use the normal periodic gap pattern(s)/gap configuration(s) for receiving paging (e.g., paging DCI, short message, or paging message) at NWB. The paging message, especially the short message, may include the ETWS indication and/or CMAS indication and/or PWS indication. The UE may need to read the system information for acquiring the ETWS information (e.g., the primary/secondary/integrated notification of the ETWS) and/or CMAS information (e.g., the warning notification of the CMAS) and may ignore/suspend the following normal periodic/aperiodic gap pattern(s)/gap configuration(s) configured by NWA in NWB to acquire the ETWS information (e.g., the primary/secondary/integrated notification of the ETWS) and/or CMAS information (e.g., the warning notification of the CMAS). The UE may perform to acquire SIB(s) such as SIB6, SIB7, or SIBS immediately. If the UE does not return to NWA in the configured gap duration, then the state of the NWA may transfer to RRC_IDLE/RRC_INACTIVE state and the following configured normal periodic gap pattern(s)/gap configuration(s) in NWA may be locally released.

In some implementations, as the periodic gap pattern(s)/gap configuration(s) with capability loan configured and activated, a UE (e.g., a MUSIM UE with 1RX/TX) may use the periodic gap pattern(s)/gap configuration(s) with capability loan for receiving paging (e.g., paging DCI, short message, or paging message) at NWB. The paging message, especially the short message, may include the ETWS indication and/or CMAS indication and/or PWS indication. The UE may need to read the system information for acquiring the ETWS information (e.g., the primary/secondary/integrated notification of the ETWS) and/or CMAS information (e.g., the warning notification of the CMAS) and may ignore/suspend the following normal periodic/aperiodic gap pattern(s)/gap configuration(s) configured by NWA in NWB to acquire the ETWS information (e.g., the primary/secondary/integrated notification of the ETWS) and/or CMAS information (e.g., the warning notification of the CMAS). The UE may acquire SIB6, SIB7, or SIB8 immediately. The UE may schedule RX resources back to the NWA after the UE acquires the ETWS information (e.g., the primary/secondary/integrated notification of the ETWS) and/or CMAS information (e.g., the warning notification of the CMAS) and the UE may remain in RRC_CONNECTED state in NWA.

In some implementations, as the UE in NWA (e.g., in RRC_CONNECTED state) monitors short messages transmitted with Paging Radio Network Temporary Identifier (P-RNTI) over DCI including ETWS indication and/or CMAS indication and/or PWS indication, the UE may need to read the system information for acquiring the ETWS information (e.g., the primary/secondary/integrated notification of the ETWS) and/or CMAS information (e.g., the warning notification of the CMAS) and may ignore/suspend the following normal periodic/aperiodic gap pattern(s)/gap configuration(s) configured by NWA and measurement gap in NWA to acquire the ETWS information (e.g., the primary/secondary/integrated notification of the ETWS) and/or CMAS information (e.g., the warning notification of the CMAS).

In some implementations, during the switching procedure for without leaving RRC_CONNECTED state in NWA, a UE (e.g., a MUSIM UE with 1RX/TX) may receive paging (e.g., paging DCI, short message, or paging message) at NWB. The paging message, especially the short message, may include the ETWS indication and/or CMAS indication and/or PWS indication. The UE may need to read the system information for acquiring the ETWS information (e.g., the primary/secondary/integrated notification of the ETWS) and/or CMAS information (e.g., the warning notification of the CMAS). The UE may acquire SIB6, SIB7, or SIB8 immediately. The UE may stop DL reception on NWA and switch the RX resource to NWB for acquiring the ETWS information (e.g., the primary/secondary/integrated notification of the ETWS) and/or CMAS information (e.g., the warning notification of the CMAS). The UE in NWA (e.g., in RRC_CONNECTED state) may transfer to RRC_IDLE/RRC_INACTIVE state if the UE does not return to NWA in the configured gap duration.

In some implementations, during switching procedure for without leaving RRC_CONNECTED state in NWA, a UE (e.g., a MUSIM UE with 2RX/TX) may receive paging (e.g., paging DCI, short message, or paging message) at NWB. The paging message, especially the short message, may include the ETWS indication and/or CMAS indication and/or PWS indication. The UE may need to read the system information for acquiring the ETWS information (e.g., the primary/secondary/integrated notification of the ETWS) and/or CMAS information (e.g., the warning notification of the CMAS). The UE may stop DL reception on NWA and switch the RX resource to NWB for acquiring the ETWS information (e.g., the primary/secondary/integrated notification of the ETWS) and/or CMAS information (e.g., the warning notification of the CMAS). The UE may acquire SIB6, SIB7, or SIB8 immediately. The UE may schedule the RX resource back to the NWA after the UE acquires the ETWS information (e.g., the primary/secondary/integrated notification of the ETWS) and/or CMAS information (e.g., the warning notification of the CMAS) and the UE may remain in RRC_CONNECTED state in NWA.

Figure 6:
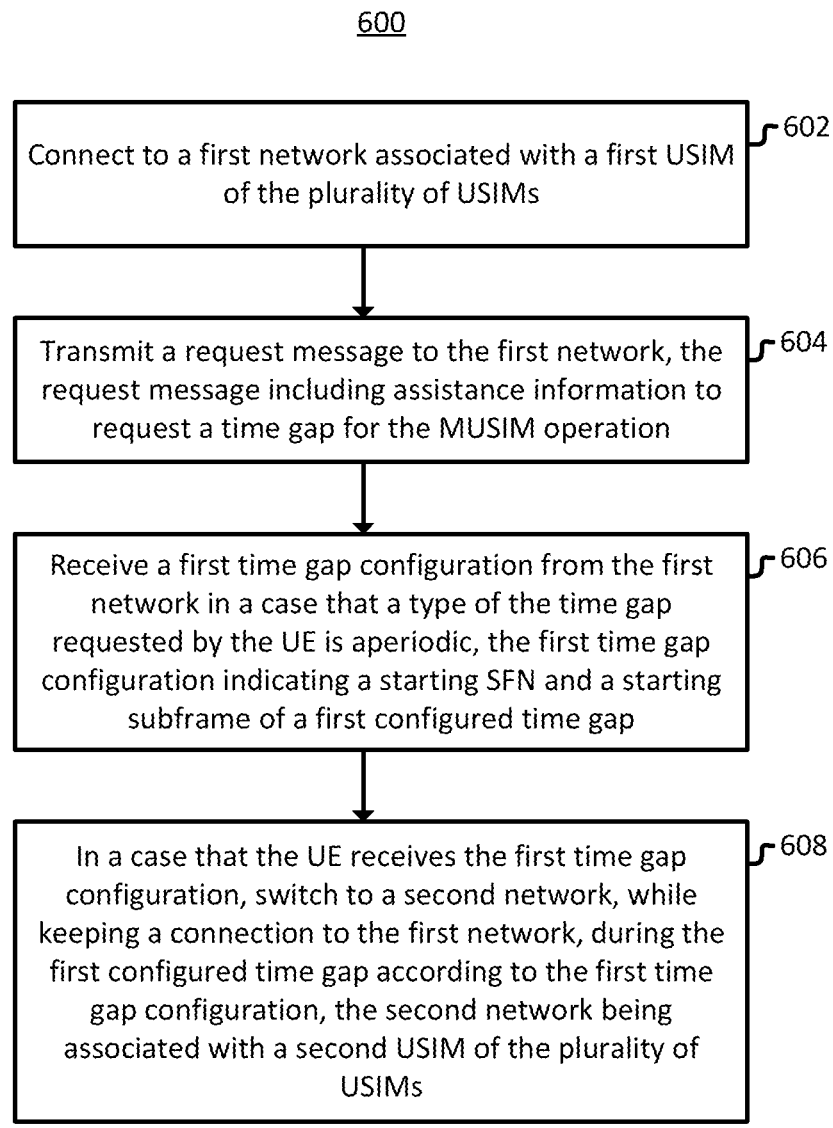
FIG. 6 is a flowchart for a method of performing a MUSIM operation by a UE adapted to be equipped with a plurality of USIMs, according to an example implementation of the present disclosure.

FIG. 6 is a flowchart for a method 600 of performing a MUSIM operation by a UE adapted to be equipped with a plurality of USIMs, according to an example implementation of the present disclosure. Although actions 602, 604, 606, and 608 are illustrated as separate actions represented as independent blocks in FIG. 6, these separately illustrated actions should not be construed as necessarily order-dependent. The order in which the actions are performed in FIG. 6 is not intended to be construed as a limitation, and any number of the disclosed blocks may be combined in any order to implement the method, or an alternate method. Moreover, each of actions 602, 604, 606, and 608 may be performed independently of other actions, and can be omitted in some implementations of the present disclosure.

In action 602, the UE may connect to a first network (e.g., NWA) associated with a first USIM of the plurality of USIMs.

In action 604, the UE may transmit a request message to the first network. The request message may include assistance information to request a time gap for the MUSIM operation. In some implementations, the assistance information may indicate a preferred starting SFN of the time gap and a preferred starting subframe of the time gap. That is, with the assistance information, the first network may be informed of the UE's preference with regard to the requested time gap (e.g., the first time gap). In some implementations, the assistance information may include an indication of whether the type of the (requested) time gap is aperiodic (or periodic). In some implementations, the network (e.g., the first network) may be aware of the type of the (requested) time gap being aperiodic (or periodic) based on the assistance information included in the request message, even if there is no explicit indication of the type of the (requested) time gap in the assistance information.

In action 606, the UE may receive a first time gap configuration from the first network in a case that a type of the time gap requested by the UE is aperiodic. The first time gap configuration may indicate a starting SFN and a starting subframe of a first configured time gap. In some implementations, the first time gap configuration may include an indication of whether a type of the first configured time gap is aperiodic (or periodic). In some implementations, the UE may be aware of the type of the (configured) time gap being aperiodic (or periodic) based on the parameters included in the gap configuration, even if there is no explicit indication of the type of the (configured) time gap in the gap configuration.

In action 608, in a case that the UE receives the first time gap configuration, the UE may switch to a second network (e.g., NWB), while keeping a connection to the first network, during the first configured time gap according to the first time gap configuration. The second network may be associated with a second USIM of the plurality of USIMs. For example, the UE may stay in RRC_CONNECTED state in the first network while switching to the second network during the first time gap. The UE may perform certain activities with the second network during the first time gap. The activities may include, but not limited to, monitoring PDCCH occasion(s) from the second network, monitoring paging DCI from the second network, receiving paging message(s) from the second network, performing measurement(s) in the second network, acquiring SI from the second network, performing registration procedure(s) with the second network, performing a TAU procedure with the second network, and/or performing an RNAU procedure with the second network. In some implementations, after switching to the second network, the UE may monitor a downlink channel on the second network during the first configured time gap.

In some implementations, the UE may receive a second time gap configuration from the first network in a case that the type of the time gap requested by the UE is periodic. That is, a network (e.g., the first network) may decide to reply to a UE with a first time gap configuration and/or a second time gap configuration according to the type of the time gap requested by the UE (e.g., periodic or aperiodic).

In some implementations, the second time gap configuration may indicate a repetition period of a second configured time gap. For example, the second configured time gap may periodically occur since its type is periodic. The repetition period may determine the time interval of two adjacent second configured time gaps.

In a case that the UE receives the second time gap configuration, the UE may switch to the second network, while keeping the connection to the first network, during the second configured time gap according to the second time gap configuration. The UE may perform certain activities with the second network during the second time gap. The activities may include, but not limited to, monitoring PDCCH occasion(s) from the second network, monitoring paging DCI from the second network, receiving paging message(s) from the second network, performing measurement(s) in the second network, acquiring SI from the second network, performing registration procedure(s) with the second network, performing a TAU procedure with the second network, and/or performing an RNAU procedure with the second network.

In some implementations, the UE may transmit a gap release message to the first network, receive a release message from the first network, and release the second time gap configuration in response to receiving the release message.

In some implementations, the UE may start a prohibit timer upon transmitting the assistance information (or the request message) to the first network. The UE is prohibited from transmitting another request message to the first network while the prohibit timer is running. Through the mechanism, the UE is prevented from transmitting the assistance information/request message to the first network too frequently.

In some implementations, the first configured time gap may start at the starting subframe with the starting SFN (indicated by the first time gap configuration).

According to method 600, the UE is allowed to request a (preferred) gap type from the network, so that the network can know in advance when the UE will likely switch to another network for data reception. In this way, the network to which the UE is connected can be prevented from sending data to the UE during an inappropriate period, resulting in missed data reception. Therefore, method 600 improves the efficiency of the MUSIM operation.

Figure 7:
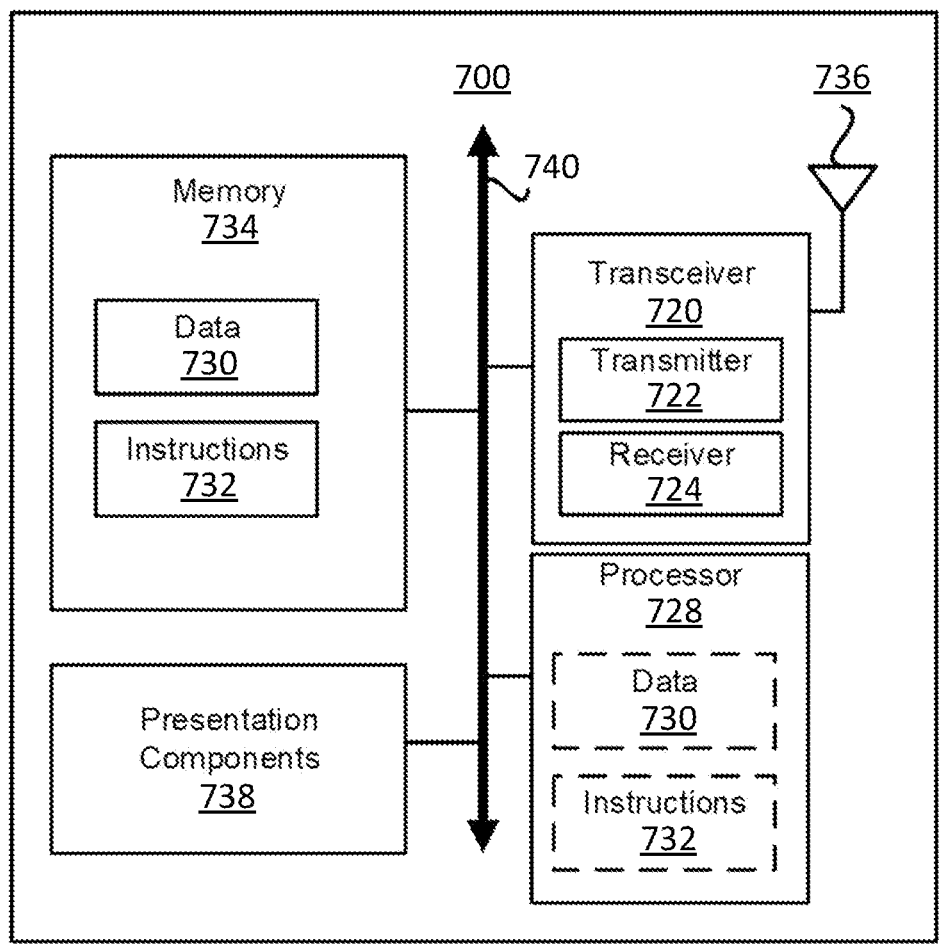
FIG. 7 is a block diagram illustrating a node for wireless communication, according to an example implementation of the present disclosure.

FIG. 7 is a block diagram illustrating a node 700 for wireless communication, according to an example implementation of the present disclosure. As illustrated in FIG. 7, a node 700 may include a transceiver 720, a processor 728, a memory 734, one or more presentation components 738, and at least one antenna 736. The node 700 may also include a radio frequency (RF) spectrum band module, a BS communications module, a network communications module, and a system communications management module, Input/Output (I/O) ports, I/O components, and a power supply (not illustrated in FIG. 7).

Each of the components may directly or indirectly communicate with each other over one or more buses 740. The node 700 may be a UE or a BS that performs various functions disclosed with reference to FIGS. 1 through 6.

The transceiver 720 has a transmitter 722 (e.g., transmitting/transmission circuitry) and a receiver 724 (e.g., receiving/reception circuitry) and may be configured to transmit and/or receive time and/or frequency resource partitioning information. The transceiver 720 may be configured to transmit in different types of subframes and slots including, but not limited to, usable, non-usable, and flexibly usable subframes and slot formats. The transceiver 720 may be configured to receive data and control channels.

The node 700 may include a variety of computer-readable media. Computer-readable media may be any available media that may be accessed by the node 700 and include volatile (and/or non-volatile) media and removable (and/or non-removable) media.

The computer-readable media may include computer-storage media and communication media. Computer-storage media may include both volatile (and/or non-volatile media) and removable (and/or non-removable) media implemented in any method or technology for storage of information, such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave or other transport mechanisms, and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, radio frequency (RF), infrared, and other wireless media. Combinations of any of the previously listed components should also be included within the scope of computer-readable media.

The memory 734 may include computer-storage media in the form of volatile and/or non-volatile memory. The memory 734 may be removable, non-removable, or a combination thereof. Example memory may include solid-state memory, hard drives, optical-disc drives, etc. As illustrated in FIG. 7, the memory 734 may store a computer-readable and/or computer-executable program 732 (e.g., software codes or a set of instructions) that are configured to, when executed, cause the processor 728 to perform various functions disclosed herein, for example, with reference to FIGS. 1 through 6. In some implementations, the program 732 may not be directly executable by the processor 728 but may be configured to cause the node 700 (e.g., when compiled and executed) to perform various functions disclosed herein.

The processor 728 (e.g., having processing circuitry) may include an intelligent hardware device, e.g., a Central Processing Unit (CPU), a microcontroller, an ASIC, etc. The processor 728 may include memory. The processor 728 may process the data 730 and the program 732 received from the memory 734, and information transmitted and received via the transceiver 720, the baseband communications module, and/or the network communications module. The processor 728 may also process information to send to the transceiver 720 for transmission via the antenna 736 to the network communications module for transmission to a Core Network (CN).

One or more presentation components 738 may present data indications to a person or another device. Examples of presentation components 738 may include a display device, a speaker, a printing component, a vibrating component, etc.

In view of the present disclosure, various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method for a User Equipment (UE) adapted to be equipped with a plurality of Universal Subscriber Identity Modules (USIMs) for performing a Multi-Universal Subscriber Identity Module (MUSIM) operation, the method comprising:
   connecting to a first network associated with a first USIM of the plurality of USIMs;
   transmitting a request message to the first network, the request message comprising assistance information to request a time gap for the MUSIM operation;
   receiving a first time gap configuration from the first network in a case that a type of the time gap requested by the UE is aperiodic, the first time gap configuration indicating a starting System Frame Number (SFN) and a starting subframe of a first configured time gap; and
   in a case that the UE receives the first time gap configuration, switching to a second network, while keeping a connection to the first network, during the first configured time gap according to the first time gap configuration, the second network being associated with a second USIM of the plurality of USIMs.

2. The method of claim 1, further comprising:
   receiving a second time gap configuration from the first network in a case that the type of the time gap requested by the UE is periodic, the second time gap configuration indicating a repetition period of a second configured time gap.

3. The method of claim 2, further comprising:
   in a case that the UE receives the second time gap configuration, switching to the second network, while keeping the connection to the first network, during the second configured time gap according to the second time gap configuration.

4. The method of claim 2, further comprising:
   transmitting a gap release message to the first network;
   receiving a release message from the first network; and
   releasing the second time gap configuration in response to receiving the release message.

5. The method of claim 1, wherein the assistance information indicates a preferred starting SFN of the time gap and a preferred starting subframe of the time gap.

6. The method of claim 1, wherein the assistance information comprises an indication of whether the type of the time gap requested by the UE is aperiodic.

7. The method of claim 1, wherein the first time gap configuration comprises an indication of whether a type of the first configured time gap is aperiodic.

8. The method of claim 1, further comprising:
starting a prohibit timer upon transmitting the assistance information to the first network,
wherein the UE is prohibited from transmitting another request message to the first network while the prohibit timer is running.

9. The method of claim 1, wherein the first configured time gap starts at the starting subframe with the starting SFN.

10. The method of claim 1, further comprising, after switching to the second network, monitoring a downlink channel on the second network during the first configured time gap.

11. A User Equipment (UE) adapted to be equipped with a plurality of Universal Subscriber Identity Modules (USIMs) for performing a Multi-Universal Subscriber Identity Module (MUSIM) operation, the UE comprising:
transmission and reception circuitry; and
at least one processor coupled to the transmission and reception circuitry and configured to:
connect the UE to a first network associated with a first USIM of the plurality of USIMs;
transmit, via the transmission and reception circuitry, a request message to the first network, the request message comprising assistance information to request a time gap for the MUSIM operation;
receive, by the transmission and reception circuitry, a first time gap configuration from the first network in a case that a type of the time gap requested by the UE is aperiodic, the first time gap configuration indicating a starting System Frame Number (SFN) and a starting subframe of a first configured time gap; and
in a case that the UE receives the first time gap configuration, cause the UE to switch to a second network, while keeping a connection to the first network, during the first configured time gap according to the first time gap configuration, the second network being associated with a second USIM of the plurality of USIMs.

12. The UE of claim 11, wherein the at least one processor is further configured to:
receive, by the transmission and reception circuitry, a second time gap configuration from the first network in a case that the type of the time gap requested by the UE is periodic, the second time gap configuration indicating a repetition period of a second configured time gap.

13. The UE of claim 12, wherein the at least one processor is further configured to:
in a case that the UE receives the second time gap configuration, cause the UE to switch to the second network, while keeping the connection to the first network, during the second configured time gap according to the second time gap configuration.

14. The UE of claim 12, wherein the at least one processor is further configured to:
transmit, via the transmission and reception circuitry, a gap release message to the first network;
receive, by the transmission and reception circuitry, a release message from the first network; and
release the second time gap configuration in response to receiving the release message.

15. The UE of claim 11, wherein the assistance information indicates a preferred starting SFN of the time gap and a preferred starting subframe of the time gap.

16. The UE of claim 11, wherein the assistance information comprises an indication of whether the type of the time gap requested by the UE is aperiodic.

17. The UE of claim 11, wherein the first time gap configuration comprises an indication of whether a type of the first configured time gap is aperiodic.

18. The UE of claim 11, wherein the at least one processor is further configured to:
start a prohibit timer upon transmitting the assistance information to the first network,
wherein the UE is prohibited from transmitting another request message to the first network while the prohibit timer is running.

19. The UE of claim 11, wherein the first configured time gap starts at the starting subframe with the starting SFN.

20. The UE of claim 11, wherein the at least one processor is further configured to, after the UE switches to the second network, cause the UE to monitor a downlink channel on the second network during the first configured time gap.

* * * * *